US012257996B2

(12) United States Patent
Kim (10) Patent No.: US 12,257,996 B2
(45) Date of Patent: Mar. 25, 2025

(54) CORNER MODULE FOR VEHICLE (71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 506 days.

(21) Appl. No.: 17/364,333

(22) Filed: Jun. 30, 2021

(65) Prior Publication Data

US 2022/0001846 A1    Jan. 6, 2022

(30) Foreign Application Priority Data

Jul. 1, 2020    (KR) .................. 10-2020-0080709

(51) Int. Cl.
G05D 1/00    (2024.01)
B60K 7/00    (2006.01)
B60T 8/26    (2006.01)

(52) U.S. Cl.
CPC ............ *B60T 8/267* (2013.01); *B60K 7/0007* (2013.01); *B60K 2007/0038* (2013.01)

(58) Field of Classification Search
CPC ..................................................... B60T 8/267
See application file for complete search history.

(56) References Cited

U.S. PATENT DOCUMENTS 4,175,646 A * 11/1979 Eikelberger .......... B60T 13/745
188/162
4,457,101 A * 7/1984 Matsushiro ............ A63H 30/04
446/460

(Continued)

FOREIGN PATENT DOCUMENTS

JP    2012183981    *    9/2012

OTHER PUBLICATIONS

Screen captures from Duff, Mike, The 2021 Ferrari SF90 Stradale Goes from Silent to Violent, 2020 [retrieved on Dec. 14, 2023]. Retrieved from the Internet: <https://www.caranddriver.com/reviews/a32973472/2021-ferrari-sf90-stradale-drive/>) (Year: 2020).*

(Continued)

*Primary Examiner* — Redhwan K Mawari
*Assistant Examiner* — Paul W Arellano
(74) *Attorney, Agent, or Firm* — Morgan, Lewis & Bockius LLP (57) ABSTRACT

The present disclosure in at least one embodiment provides a corner module for a vehicle, including a front-wheel corner module configured to drive a front wheel and including a front-wheel inwheel motor installed on the front wheel to generate a driving force and a friction braking device configured to generate a braking force on the front wheel, a rear-wheel corner module configured to drive a rear wheel and including a rear-wheel inwheel motor installed on the rear wheel to generate a driving force, a driving information detector configured to detect driving information of the vehicle, and an electronic control unit configured to control the front-wheel corner module to form a friction braking force by using the driving information and to control the rear-wheel corner module to form a regenerative braking force, wherein the front-wheel corner module uses the front-wheel inwheel motor that is provided with a lower specification than the rear-wheel inwheel motor to save the manufacturing cost, and the rear-wheel corner module has no friction braking device installed so that the rear-wheel inwheel motor is undamaged by heat.

8 Claims, 5 Drawing Sheets

(56) References Cited

U.S. PATENT DOCUMENTS

| | | | | |
|---|---|---|---|---|
| 2003/0230443 A1* | 12/2003 | Cramer | ............... | B62D 21/152 |
| | | | | 180/65.51 |
| 2015/0137669 A1* | 5/2015 | Lampic | ................... | H02K 7/14 |
| | | | | 310/67 R |
| 2018/0086415 A1* | 3/2018 | Inase | ....................... | B62L 1/005 |
| 2018/0370508 A1* | 12/2018 | Park | ..................... | B60T 8/1766 |
| 2020/0139775 A1* | 5/2020 | Takenaka | ................. | B60K 7/00 |

OTHER PUBLICATIONS

Office Action issued on Nov. 28, 2024 in Korean Patent Application No. 10-2020-0080709 with English translation Note: U.S. Pat. No. 4457101A and US2003/0230443 A1 cited therein are already of record.

* cited by examiner

CORNER MODULE FOR VEHICLE

CROSS-REFERENCE TO RELATED APPLICATIONS

This application is based on, and claims priority from, Korean Patent Application Number 10-2020-0080709, filed Jul. 1, 2020, the disclosure of which is incorporated by reference herein in its entirety.

TECHNICAL FIELD

The present disclosure in some embodiments relates to a corner module for a vehicle.

BACKGROUND

The statements in this section merely provide background information related to the present disclosure and do not necessarily constitute prior art.

Vehicle brake systems are installed to stop or decelerate vehicles. Various types of brake systems have been provided. For example, conventional brake systems control the rotational speed of wheels through mechanical friction in the form of a caliper. In such a brake system, a driver's pedal stroke as applied to the brake pedal is transmitted to the caliper through various hydraulic devices and mechanisms, and the caliper causes friction with a disk, thereby stopping the rotation of the disk and thus the wheel. In this case, a conventional brake system forms a braking force by transmitting the pedal stroke applied to the brake pedal equally to the respective wheels.

On the other hand, an inwheel system of an electric vehicle includes motors in wheels for the motors to drive the wheels individually. Electronic corner modules are a modular system including chassis units that are each incorporated in each of the vehicle wheels and perform steering and suspension, as well as driving and braking of the vehicle. The electronic corner modules can repurpose the vacancy in the conventional engine room site for different uses where a drive or steering system once occupied with the conventional braking system.

However, the conventional braking system is susceptible to interference with an inwheel motor accommodated in an in-wheel space where the chassis unit is mounted. In the inwheel system, the inwheel motors are responsible for driving the entire vehicle, so they cannot be miniaturized beyond a limit size, when the caliper as a braking device takes a certain physical space, leaving an unsolved issue of securing proper spaces for the inwheel motors.

Additionally, for braking the vehicle, the caliper generates the braking force that accompanies heat which deteriorates the performance and durability of the inwheel motors.

SUMMARY

According to at least one embodiment, the present disclosure provides a corner module for a vehicle, including a front-wheel corner module, a rear-wheel corner module, a driving information detector, and an electronic control unit. The front-wheel corner module is configured to drive a front wheel and includes a front-wheel inwheel motor installed on the front wheel to generate a driving force and a friction braking device configured to generate a braking force on the front wheel. The rear-wheel corner module is configured to drive a rear wheel and includes a rear-wheel inwheel motor installed on the rear wheel to generate a driving force. The driving information detector is configured to detect the driving information of the vehicle. The electronic control unit is configured to control the front-wheel corner module to form a friction braking force by using the driving information and to control the rear-wheel corner module to form a regenerative braking force. Here, the front-wheel corner module uses the front-wheel inwheel motor that is provided with a lower specification than the rear-wheel inwheel motor to save the manufacturing cost. The rear-wheel corner module has no friction braking device installed so that the rear-wheel inwheel motor is undamaged by heat.

REFERENCE NUMERALS

| | |
|---|---|
| 100, 200: braking device | 111, 112, 113, 114: multiple wheels |
| 121, 122, 123, 124: multiple inwheel motors | |
| 130: multiple hydraulic calipers | |
| 140: multiple electronic mechanical brake calipers | |
| 150: multiple electronic parking brake calipers | |
| 160: electronic control unit | 170: driving information detector |
| 180: steering system | 190: suspension system |
| 300, 400: front-wheel corner module | 500: rear-wheel corner module |

DETAILED DESCRIPTION

The present disclosure according to some embodiments seeks to provide the front-wheel corner module with the front-wheel inwheel motor having a lower specification and thus more installation space secured than the rear-wheel inwheel motor to save the manufacturing cost.

Additionally, the present disclosure aims to maximize the protection of the inwheel motors from the braking system susceptible to overheating during operation, thereby stabilizing the braking system.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Figure 1:
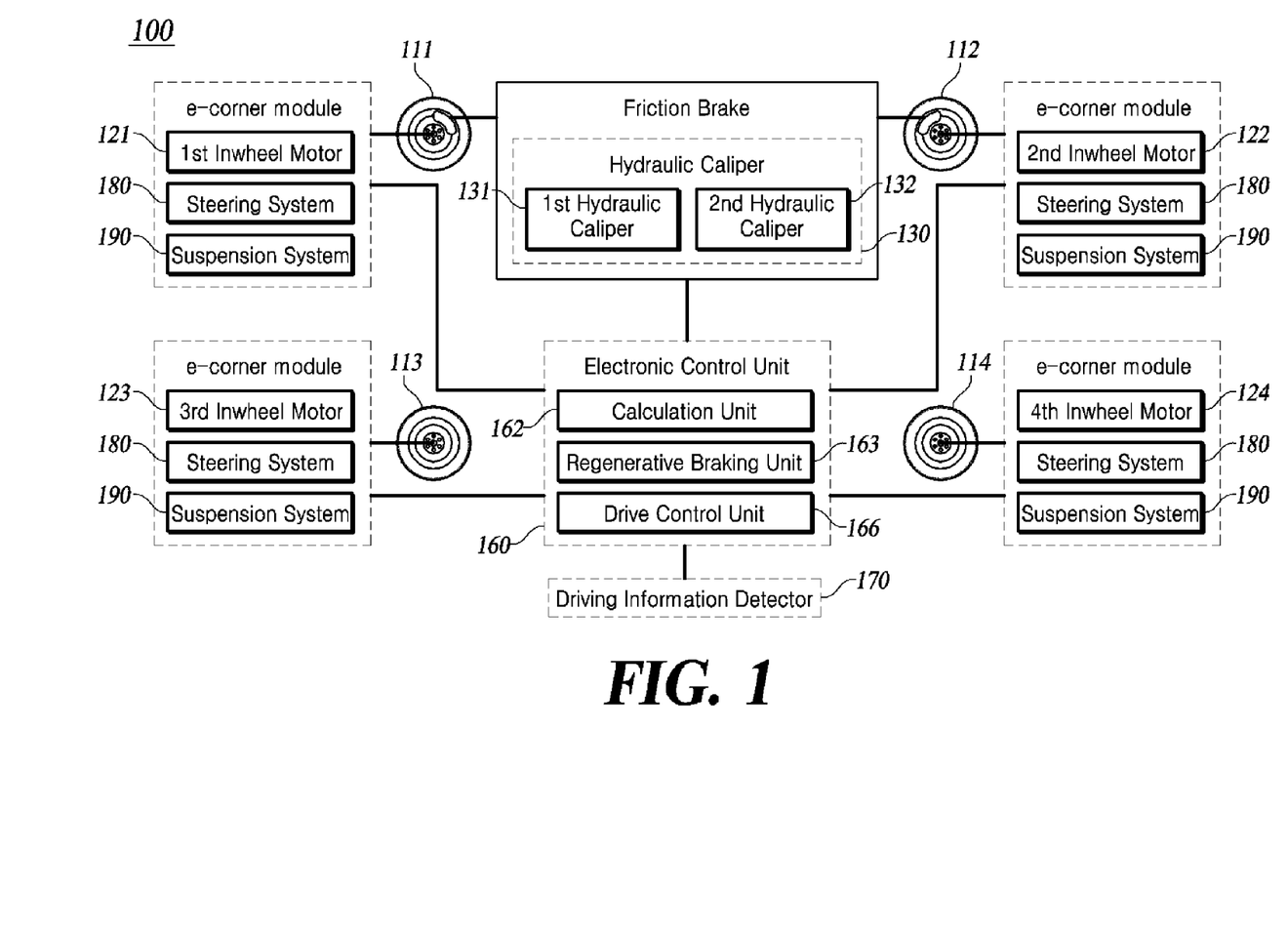
FIG. 1 is a block diagram of a brake system according to at least one embodiment of the present disclosure.

FIG. 1 is a block diagram of a brake system 100 according to at least one embodiment of the present disclosure.

As shown in FIG. 1, the braking device 100 according to at least one embodiment includes all or some of multiple wheels 111, 112, 113, 114, multiple inwheel motors 121, 122, 123, 124, multiple hydraulic calipers 130 each included in each of the front-wheel e-corner modules or electronic corner modules, an electronic control unit (ECU) 160, a driving information detector 170, steering systems 180, and suspension systems 190.

The multiple wheels 111, 112, 113, 114 include a front left wheel 111, a front right wheel 112, a rear left wheel 113, and a rear right wheel 114. The multiple wheels are installed to be rotatable on the vehicle body, and they rotate by receiving the driving force of the plurality of inwheel motors 121, 122, 123, 124.

The multiple inwheel motors 121, 122, 123, 124 include the first inwheel motor 121 installed on the front left wheel 111, the second inwheel motor 122 installed on the front right wheel 112, a third inwheel motor 123 installed on the rear left wheel 113, and a fourth inwheel motor 124 installed on the rear right wheel 114.

In at least one embodiment, front-wheel inwheel motors 121, 122 refer to the first inwheel motor 121 and the second inwheel motor 122, and rear-wheel inwheel motors 123, 124 refer to the third inwheel motor 123 and the fourth inwheel motor 124.

The multiple hydraulic calipers 131, 132 include at least one of a first hydraulic caliper 131 and a second hydraulic caliper 132.

The first hydraulic caliper 131 is installed on the front left wheel 111, and the second hydraulic caliper 132 is installed on the front right wheel 112. The first hydraulic caliper 131 transmits a first hydraulic braking force to the front left wheel 111, and the second caliper 132 transmits a second hydraulic braking force to the front right wheel 112.

The multiple hydraulic calipers 131, 132 of at least one embodiment are configured to be integral with an electronic parking brake (EPB). The integral or separate configuration will be described in more detail in FIG. 6.

The electronic control unit 160 according to an exemplary embodiment of the present disclosure may be a processor (e.g., computer, microprocessor, CPU, ASIC, circuitry, logic circuits, etc.). The electronic control unit 160 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The electronic control unit 160 includes all or some of a calculation unit 162, a regenerative braking unit 163, and a drive control unit 162.

The calculation unit 162 controls the respective inwheel motors 121, 122, 123, 124 by monitoring driving information of the wheels 111, 112, 113, 114. At this time, the electronic control unit 160 calculates a braking force for braking the plurality of wheels 111, 112, 113, 114 based on the driving information.

The braking force includes braking forces for the respective wheels 111, 112, 113, 114, in particular, a front left wheel braking force required for the front left wheel 111, a front right wheel braking force required for the front right wheel 112, a rear left wheel braking force required for the rear left wheel 113, and a rear right wheel braking force required for the rear right wheel 114.

The regenerative braking unit 163 controls the rear-wheel inwheel motors 123, 124 to form regenerative braking forces. The regenerative braking forces include a first regenerative braking force for the rear left wheel 113 and a second regenerative braking force for the rear right wheel 114. The regenerative braking unit 163 calculates the first regenerative braking force and the second regenerative braking force.

Upon calculating the regenerative braking forces for the respective rear wheels 113, 114, the electronic control unit 160 controls the rear-wheel inwheel motors 123, 124 so that the respective regenerative braking forces are applied to the rear wheels 113, 114. Specifically, the electronic control unit 160 controls the third inwheel motor 123 to apply the first regenerative braking force to the rear left wheel 113 and controls the fourth inwheel motor 124 to apply the second regenerative braking force to the rear right wheel 114.

Figure 5A:
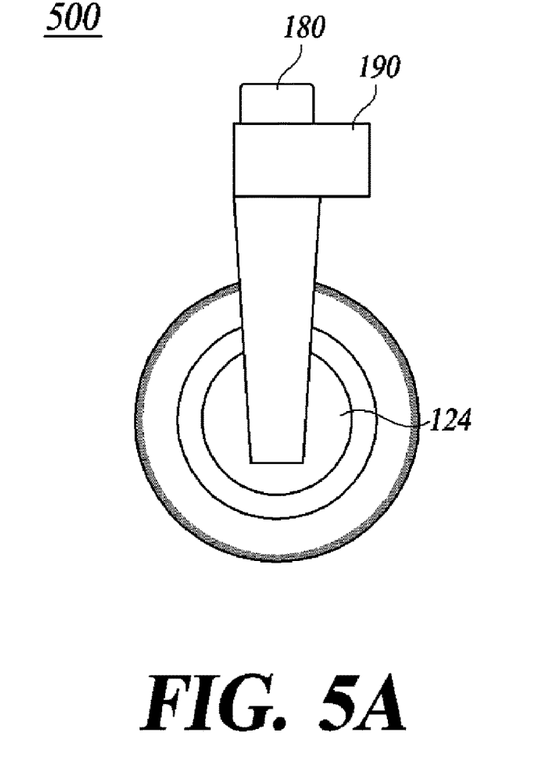
FIGS. 5A and 5B are a side view and a front view of a rear-wheel corner module.
Figure 5B:
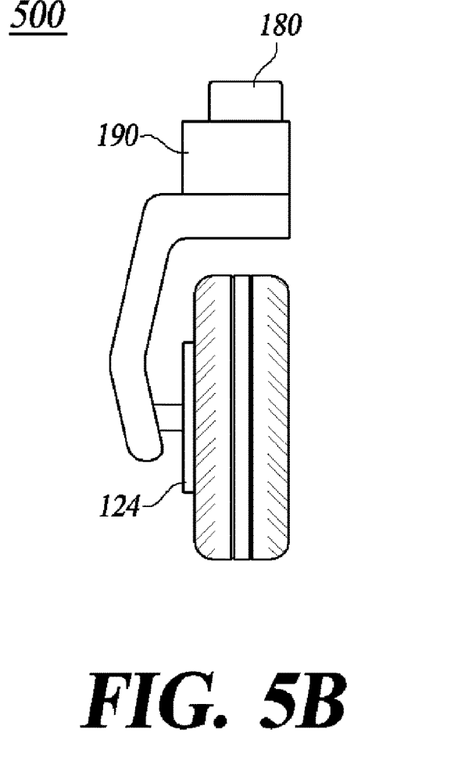

According to at least one embodiment of the present disclosure, at least one rear-wheel corner module 500 is provided with none of friction braking devices such as a hydraulic caliper, an electronic mechanical brake caliper, an electronic parking brake caliper, etc., and accordingly the rear-wheel corner module 500 is supplied with a braking force formed by regenerative braking. Therefore, a rear left wheel braking force and a rear right wheel braking force are calculated based on the regenerative braking force. The rear-wheel corner module 500 will be described in detail in FIG. 5.

The drive control unit 166 controls the operation of each of the inwheel motors 121, 122, 123, 124 based on the calculated braking forces.

The driving information detector 170 includes all or some of a wheel speed sensor, a torque sensor, an acceleration sensor, a lateral acceleration sensor, a pedal stroke sensor, and a steering angle sensor.

The wheel speed sensor detects the wheel speed, the torque sensor detects the torque of the inwheel motor, the acceleration sensor detects the acceleration of the vehicle, and the lateral acceleration sensor the lateral acceleration, the pedal stroke sensor the stroke on the brake pedal, and the steering angle sensor the steering angle of the vehicle. The driving information detector 170 transmits information detected by the respective sensors to the electronic control unit 160.

The steering systems 180 are each adapted to change a steering angle of a wheel based on a driver's steering intention. A typical configuration related to the steering system is a technique that is obvious to a person skilled in the art, and thus, illustration and description thereof will be omitted.

The suspension systems 190 are each adapted to support the weight of the vehicle body by a spring action and at the same time alleviate the vertical vibration of the wheel to improve the ride comfort and prevent damage to the vehicle and parts due to impact. A typical configuration related to the suspension system 190 is a technique that is obvious to a person skilled in the art, and thus, illustration and description thereof will be omitted.

Figure 2:
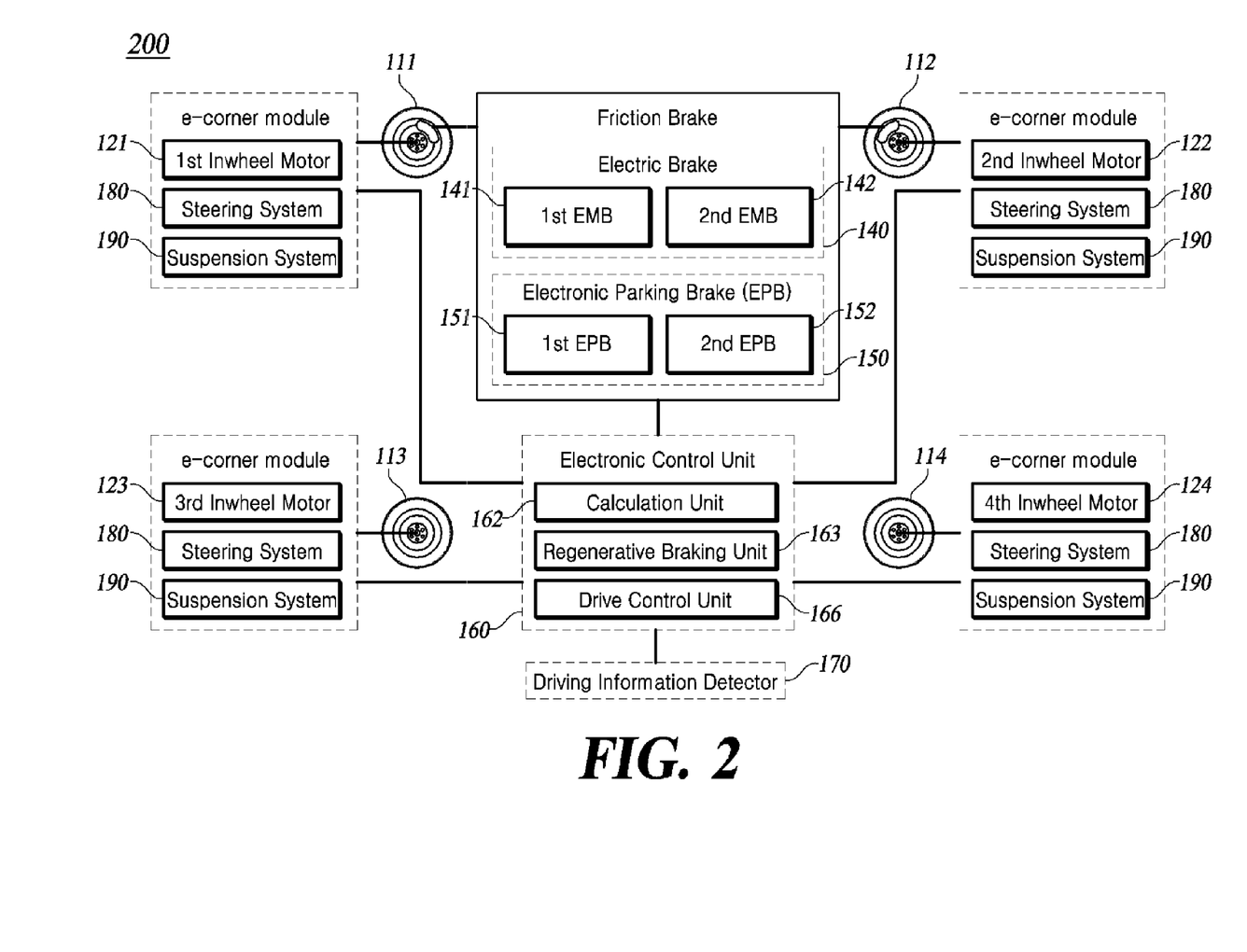
FIG. 2 is a block diagram of a brake system according to another embodiment of the present disclosure.

FIG. 2 is a block diagram of a brake system according to another embodiment of the present disclosure.

As shown in FIG. 2, a braking device 200 according to another embodiment of the present disclosure includes all or some of the multiple wheels 111, 112, 113, 114, multiple inwheel motors 121, 122, 123, 124, multiple electronic mechanical brake (EMB) calipers 140 each included in each of the front-wheel e-corner modules or electronic corner modules, multiple electronic parking brake (EPB) calipers 150 each included in each of the front-wheel electronic corner modules, an electronic control unit (ECU) 160, a driving information detector 170, steering systems 180, and suspension systems 190.

A detailed description of the components as described already with FIG. 1 will be omitted.

The multiple EMB calipers 141, 142 include a first EMB caliper 141 and a second EMB caliper 142.

The first EMB caliper 141 is installed on the front left wheel 111, and the second EMB caliper 142 is installed on the front right wheel 112.

The EMB calipers will now be described in more detail. The multiple EMB calipers 140 each include all or some of a gearbox, a motor, a caliper housing, and a caliper body.

The motor generates power by rotating in a forward or reverse direction according to the current flow. Here, the power means the rotational force of the motor. The rotational force of the motor is transmitted to a screw (not shown) of a gearbox to form a braking force.

The gearbox includes a plurality of gears and screws for moving a spindle (not shown) linearly by the rotational force of the motor. When the spindle of the gearbox makes a linear motion, a piston part (not shown) attached to one end of a caliper body moves forward or backward, and accordingly, the multiple EMB calipers 140 form a braking force.

In the present disclosure, a typical configuration related to driving a gearbox is a technique that is obvious to a person skilled in the art, and thus, illustration and description thereof will be omitted.

Electronic mechanical brake (EMB) was developed as an electronic parking brake (EPB), but recently, its use has been expanded to serve as the main brake replacing the conventional hydraulic brake.

In general, an electronic brake comes integrated with a parking function, but at least one embodiment of the present disclosure configures the multiple EMB calipers 140 as the main brake without a parking function and employs separate dedicated calipers as the multiple EPB calipers 150.

The multiple EPB calipers 150 include a first EPB caliper 151 and a second EPB caliper 152.

The first EPB caliper 151 is installed on the front left wheel 111, and the second EPB caliper 152 is installed on the front right wheel 112.

To be more specific, the multiple EPB calipers 150 are each adapted to generate a parking braking force.

In another embodiment of the present disclosure, the multiple electronic parking brake calipers 150 are separate dedicated calipers. The present disclosure secures redundancy by configuring the EPB caliper to be separated from the EMB caliper as described above.

The multiple EPB calipers 150 take the caliper action under the control of the electronic control unit 160 to generate a braking force by depressing a disk mounted to corotate with the wheel of the vehicle. In other words, to generate braking force, the caliper is operated using a mechanical mechanism driven by an electric motor, and when the electronic control unit 160 drives the electric motor, the rotational force of the motor is converted into a linear force and transmitted to the piston in the cylinder of the caliper. Then, when the piston moves and depresses friction pads which, in turn, clamp both surfaces of a disk (not shown) to generate a braking force.

The multiple EPB calipers 150 provide a variety of additional functions for improving the convenience of the driver and stability in the vehicle driving besides the simple function of immobilizing the vehicle during parking. One of these additional functions is the dynamic braking function that brakes the vehicle while driving. Dynamic braking is a function that allows the driver to use the electronic parking brake as an emergency braking device when an abnormality occurs in the hydraulic brake installed in the vehicle.

At least one embodiment of the present disclosure includes the multiple EPB calipers 150 to form braking forces for the front wheels by using the dynamic braking function.

In other words, the instant embodiment of the present disclosure provides the dedicated calipers arranged independently rather than an integrated caliper, thereby allowing a failure between two independent calipers to be backed up by the other caliper, which is advantageous in terms of securing redundancy in case of an emergency to safely brake the vehicle.

The braking device 200 of FIG. 2 is similar to the braking device 100 of FIG. 1 and differs only by the configuration of the friction braking device.

FIG. 1 illustrates the hydraulic calipers 151, 152 and the EPB calipers 151, 152 that are provided, whereas FIG. 2 illustrates the EMB calipers 141, 142 and the EPB calipers 151, 152 that are provided.

Figure 3A:
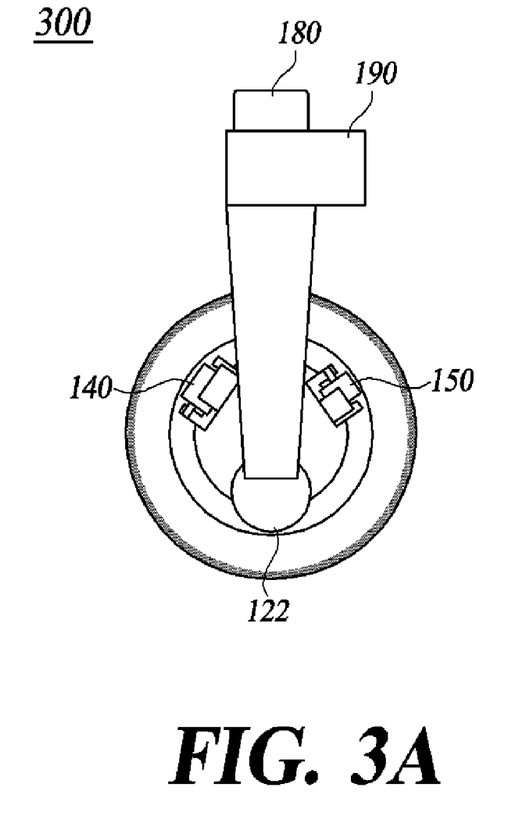
FIGS. 3A and 3B are a side view and a front view of a front-wheel corner module equipped with an electronic mechanical brake caliper and an electronic parking brake caliper.
Figure 3B:
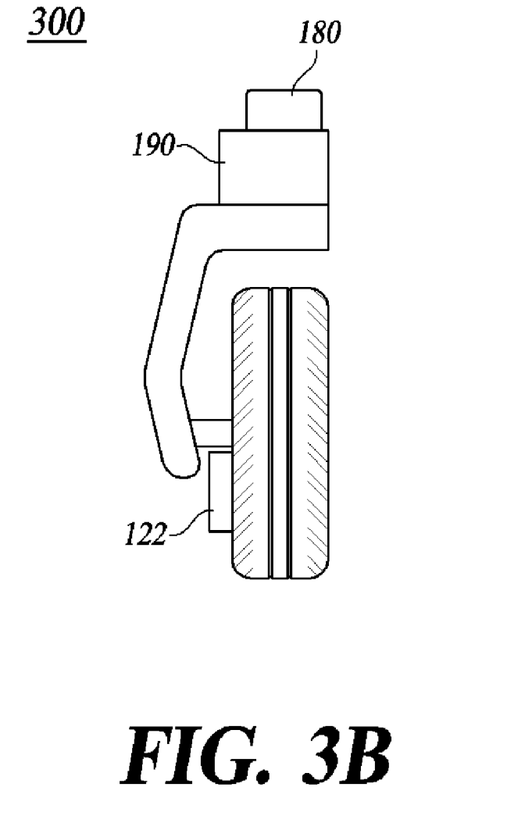

FIGS. 3A and 3B are a side view and a front view of a front-wheel corner module 300 equipped with one of the EMB calipers 140 and one of the EPB calipers 150.

Figure 4A:
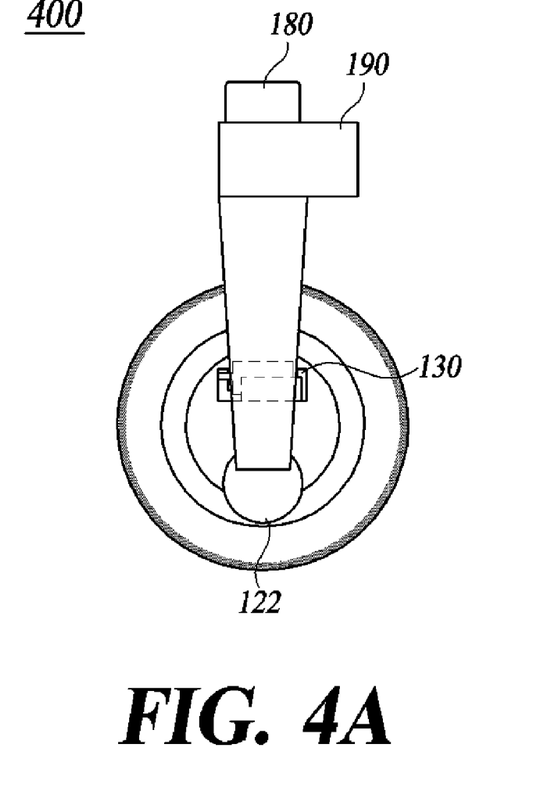
FIGS. 4A and 4B are a side view and a front view of a front-wheel corner module equipped with an electronic mechanical brake caliper and a hydraulic caliper.
Figure 4B:
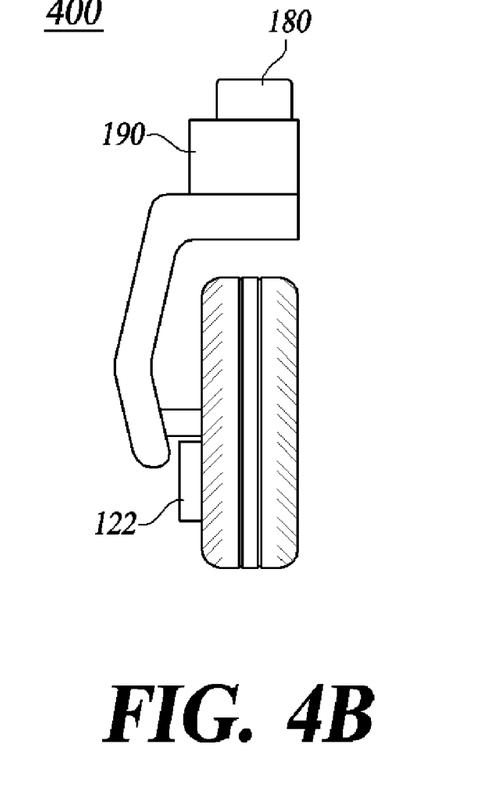

FIGS. 4A and 4B are a side view and a front view of a front-wheel corner module 400 equipped with one of the hydraulic calipers 130.

FIGS. 3A and 4A are the side views of the front-wheel corner modules 300 and 400. FIGS. 3B and 4B are front views of the front-wheel corner modules 300 and 400.

As shown in FIGS. 3A, 3B, 4A, and 4B, the present disclosure in some embodiments includes a friction braking device only in the front-wheel corner module 300 or 400.

An inwheel system including inwheel motors is an electric vehicle's system in which drive motors are individually positioned inside the respective wheels. A typical braking system involves a driving mechanism, such as an electric motor taking up the engine room, disabling the interior space inside the engine room to be repurposed for better uses. However, the inwheel system, which arranges the electric motors to be each installed inside the rim of each wheel in place of the bulky electric motor, can vacant the conventionally preoccupied engine room site, thereby increasing the usability of the interior space inside the engine room.

However, installing the inwheel motor inside the rim of the wheel involves insufficient rooms for layout freedom. Additionally, brake calipers, for example, the hydraulic calipers 131, 132, the EMB calipers 141, 142, and the EPB calipers 151, 152 when installed in a position close to the inwheel motor transmit their generated heat to the inwheel motor, resulting in degraded performance and durability of the same.

Therefore, to solve this layout shortcoming, at least one embodiment of the present disclosure installs a friction braking device only in the front-wheel corner module 300 or 400. Here, the friction braking device includes the hydraulic calipers 131, 132, EMB calipers 141, 142, and EPB calipers 151, 152, among others.

The front-wheel corner module 300 or 400 is provided with a friction braking device and is complete with a braking system of the full specification, as with a typical braking device.

On the other hand, as shown in FIGS. 5A and 5B, the rear-wheel corner module 500 is not equipped with a friction braking device. With no friction brake device installed, the inside of the wheel rim is free of layout shortage, securing the performance and durability of the inwheel motor not to deteriorate. The rear-wheel corner module 500 will be described in more detail in FIGS. 5A and 5B.

The friction braking device includes one or more of the hydraulic calipers 131, 132, the EMB calipers 141, 142, and the electronic parking brake (EPB) calipers 151, 152, where FIG. 3 illustrates the embodiment including the EMB caliper 141 or 142 (collectively indicated by 140), and the EPB caliper 151 or 152 (collectively 150), whereas FIG. 4 illustrates another embodiment including the hydraulic caliper 131 or 132 (collectively 130).

The following details the embodiment including the EMB calipers 141, 142 and the EPB caliper 151, 152. The EMB calipers 141, 142, and the EPB calipers 151, 152 might be of either an integral type or a dedicated type.

However, at least one embodiment of the present disclosure rather configures the EMB calipers 141, 142, and the EPB calipers 151, 152 to be separately dedicated. Employing the dedicated type of separate caliper allows one mate of, for example, the EMB caliper 141 or 142 when malfunctioning to be backed up by the other mate of, for example, the EPB caliper 151 or 152, which is advantageous in terms of securing redundancy in braking the vehicle.

On the other hand, the hydraulic calipers 131, 132 may be configured integrally with the EPB calipers 151, 152 as needed, effecting no difference on securing the redundancy. The hydraulic calipers 131, 132 in their inception are mechanically independent of the EPB calipers 151, 152 when in operation, and no added effort to configure the EPB calipers 151, 152 to be separated is justifiable because the endeavor makes no difference in securing redundancy.

The front-wheel inwheel motors 121, 122 of at least one embodiment of the present disclosure are made to have a lower specification than the rear-wheel inwheel motors 123, 124. This is reasonable because the front-wheel corner module 300 or 400 needs to be equipped with a friction braking device, prohibiting sufficient room to be secured for a sizable motor, for example, a big inwheel motor that attributes its maximized specification to its large size. Therefore, the front-wheel inwheel motors 121, 122 are better implemented by a small inwheel motor that is miniaturized.

On the contrary, the rear-wheel corner module 500 of FIG. 5 has a margin in terms of securing space because it takes no friction braking device to be installed, which allows implementing a sizable motor, for example, the rear-wheel inwheel motor 123 or 124 that is bulked up with maximized specification commensurate to its large scale. In sum, the front-wheel corner module 300 or 400 is advantageous in terms of securing space and cost reduction by utilizing a minimized inwheel motor.

The present disclosure is not limited to these particular example configurations and includes other embodiments where no inwheel motor is installed in the front-wheel corner module 300 or 400.

Additionally, at least one embodiment of the present disclosure includes the steering system 180 and the suspension system 190.

The electronic corner module is an integration of driving, braking, steering, and suspension systems at a location where a vehicle wheel is located. Unlike conventional internal combustion engines, the electronic corner module is a system that requires none of the drive-related mechanical apparatuses such as a separate engine and a drive shaft.

At least one embodiment of the present disclosure provides a vehicle wheel with key functions that fulfill the vehicle performance, such as braking, steering, and suspension in their entirety, which enables an arbitrary arrangement of those vehicle wheels by adjusting parameters, for example, the full width (left and right width of the vehicle) and the wheelbase (distance between the centers of the front and rear wheels) into various vehicular creations. By determining the mounting scheme of the electronic corner modules of the present disclosure as appropriate to applications, vehicle manufacturing can be readily switched between vehicle formations for current and future implementations, including front-wheel and rear-wheel drive vehicles, 2-wheel and all-wheel drive vehicles without major changes to vehicle specifications.

FIGS. 5A and 5B are a side view and a front view of the rear-wheel corner module 500.

The rear-wheel corner module 500 according to at least one embodiment of the present disclosure is unlike the front-wheel corner module 300 or 400 and includes no friction braking device. However, the present disclosure is not so limited and includes another embodiment in which a minimum viable friction braking device is mounted on the rear-wheel corner module 500.

The rear-wheel corner module 500 forms a braking force by a regenerative braking force during braking. More specifically, since the rear-wheel corner module 500 include no friction braking device, a braking force is formed on the wheel by using the regenerative braking force of the inwheel motor.

No friction braking device to install in the rear-wheel corner module 500 means no chance of heat being generated by a friction braking device during braking or transferred to the rear-wheel inwheel motors 123, 124. Therefore, the rear-wheel inwheel motors 123, 124 have advantageous effects in terms of performance and durability.

When the wheel speed is less than a certain speed, the regenerative braking force cannot generate the braking torque due to the regenerative braking, which will be described in detail in FIG. 6.

The rear-wheel corner module 500 according to at least one embodiment of the present disclosure also includes the steering system 180 and the suspension system 190.

Figure 6:
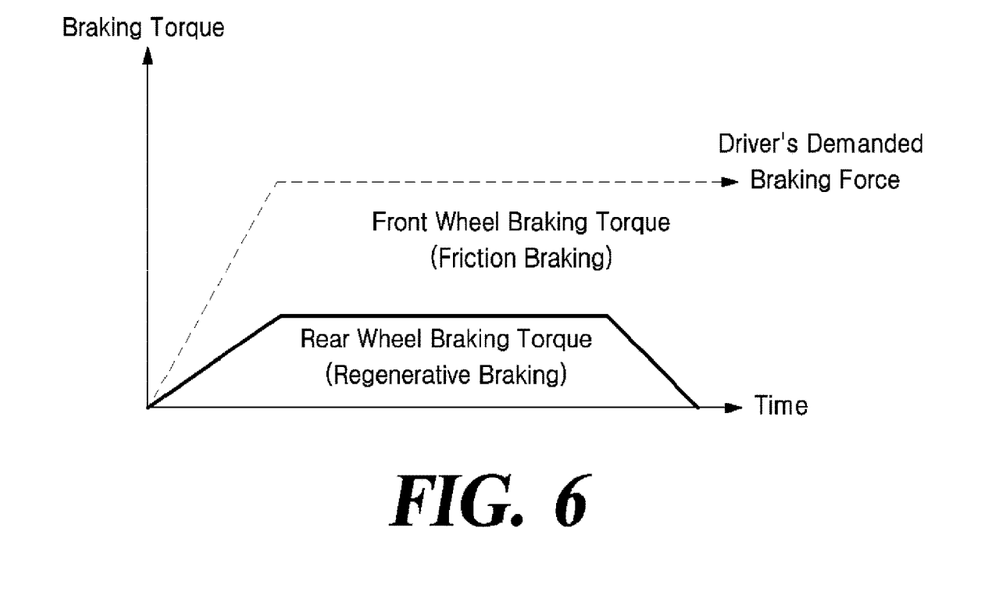
FIG. 6 is a graph showing a braking distribution between front and rear wheels when a vehicle brakes, according to at least one embodiment of the present disclosure.

FIG. 6 is a graph showing a braking distribution between the front and rear wheels when a vehicle brakes, according to at least one embodiment of the present disclosure. In FIG. 6, in response to the driver's braking request by time, the braking torques generated are shown classified by front and rear wheels.

At the outset of braking, the braking torque of the front wheel is generated by a friction braking force, and the braking torque of the rear wheel is generated by a regenerative braking force. In the graph of FIG. 6, the braking torques increase as time elapses in the initial braking period.

In the intermediate braking period, the braking torque of the front wheel and the braking torque of the rear wheel uniformly establishes braking forces.

On the other hand, in the latter braking period, the rear wheel braking torque decreases. As the rear wheel braking torque decreases, more braking torque needs to be generated at the front wheel. More specifically, when the vehicle speed is less than 10 kph (kilometer per hour) when the vehicle is braking, namely, when the wheel speed of the wheel is low, the counter electromotive force formed in the inwheel motor also becomes low, so that the inwheel motor is hard to generate sufficient generative braking torque.

This takes more braking torque to be generated at the front wheel to compensate the regenerative braking torque for the shortage as in the graph.

As described above, according to some embodiments of the present disclosure, the inwheel motor is downsized to fit in the front-wheel corner module by a wider margin and save the manufacturing cost.

Additionally, the present disclosure according to some embodiments provides the rear-wheel corner module with no friction braking device installed so that the rear-wheel inwheel motor is protected from heat damage by a friction braking device that is eliminated.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A corner module for a vehicle, comprising:
    a front-wheel corner module configured to drive a front wheel of the vehicle, the front-wheel corner module including a front-wheel inwheel motor installed on the front wheel and configured to generate a driving force on the front wheel, and a friction braking device configured to generate a braking force on the front wheel;
    a rear-wheel corner module configured to drive a rear wheel, and including a rear-wheel inwheel motor installed on the rear wheel and configured to generate a driving force on the rear wheel;
    a driving information detector configured to detect driving information of the vehicle; and
    an electronic control unit (ECU) configured to control the front-wheel corner module to form a friction braking force by using the driving information and to control the rear-wheel corner module to form a regenerative braking force,
    wherein the front-wheel corner module uses the front-wheel inwheel motor that is provided with a lower specification than the rear-wheel inwheel motor,
    the rear-wheel corner module has no friction braking device installed so that the rear-wheel inwheel motor is undamaged by heat,
    the front-wheel inwheel motor is disposed inside a rim of the front wheel and lower than a central axis of the front wheel, the front-wheel corner module not having any other inwheel motor in an area above the central axis of the front wheel,
    the friction braking device comprises one or more calipers that supply a braking force to a brake disc,
    the one or more calipers are disposed above the central axis of the front wheel and disposed on an opposite side of the front-wheel inwheel motor,
    the rear-wheel inwheel motor is disposed inside a rim of the rear wheel and has the same central axis as the rear wheel, and is disposed between the rear wheel and a lower end of a suspension, and
    respective locations of the front-wheel and rear-wheel inwheel motors with respect to the central axes of the front and rear wheels are different from each other.

2. The corner module of claim 1, wherein the friction braking device comprises:
    a hydraulic caliper configured to supply a braking force to a brake disc.

3. The corner module of claim 2, wherein the hydraulic caliper is formed to be integral with an electronic parking brake that supplies the braking force to the brake disk.

4. The corner module of claim 1, wherein the friction braking device comprises:
    an electronic mechanical brake (EMB) caliper configured to supply a braking force to a brake disk.

5. The corner module of claim 4, further comprising:
    an electronic parking brake caliper configured to supply a braking force to the brake disk,
    wherein the electronic parking brake caliper is installed to be separate from the electronic mechanical brake caliper.

6. The corner module of claim 1, wherein the driving information detector comprises:
    at least one of a wheel speed sensor, a torque sensor, an acceleration sensor, a lateral acceleration sensor, a pedal stroke sensor, or a steering angle sensor.

7. The corner module of claim 1, further comprising:
    a suspension system configured to mitigate vibrations of the front wheel and the rear wheel to improve a driver's riding comfort and to keep the front-wheel corner module and the rear-wheel corner module undamaged by an impact; and
    a steering system configured to change steering angles of the front wheel and the rear wheel,
    wherein the ECU is further configured to control the steering system based on the driving information.

8. The corner module of claim 7, wherein the driving information includes steering angles measured by a steering angle sensor.

* * * * *